US011595380B2

(12) United States Patent
Landrock et al.

(10) Patent No.: US 11,595,380 B2
(45) Date of Patent: Feb. 28, 2023

(54) USER AUTHENTICATION BASED ON RFID-ENABLED IDENTITY DOCUMENT AND GESTURE CHALLENGE-RESPONSE PROTOCOL

(71) Applicant: Cryptomathic Ltd, Cambridge (GB)

(72) Inventors: Morten Landrock, Cambridge (GB); Christopher Allen, Burwell (GB)

(73) Assignee: Cryptomathic Ltd, Cambridge (GB)

( * ) Notice: Subject to any disclaimer, the term of this patent is extended or adjusted under 35 U.S.C. 154(b) by 468 days.

(21) Appl. No.: 16/626,261

(22) PCT Filed: Jun. 22, 2018

(86) PCT No.: PCT/GB2018/051761
§ 371 (c)(1),
(2) Date: Dec. 23, 2019

(87) PCT Pub. No.: WO2019/002832
PCT Pub. Date: Jan. 3, 2019

(65) Prior Publication Data
US 2020/0195636 A1   Jun. 18, 2020

(30) Foreign Application Priority Data

Jun. 30, 2017   (GB) .................................... 1710504

(51) Int. Cl.
*H04L 9/40*       (2022.01)
*G07C 9/25*       (2020.01)
*H04L 9/32*       (2006.01)
*H04W 12/47*      (2021.01)
*G07C 9/27*       (2020.01)

(52) U.S. Cl.
CPC ............ *H04L 63/0853* (2013.01); *G07C 9/25* (2020.01); *G07C 9/27* (2020.01); *H04L 9/3231* (2013.01);
(Continued)

(58) Field of Classification Search
CPC ............ H04L 63/0853; H04L 63/0861; H04L 9/3231; H04L 2209/805; H04L 9/3271; G07C 9/27; G07C 9/25; H04W 12/47
See application file for complete search history.

(56) References Cited

U.S. PATENT DOCUMENTS

2010/0161994 A1*  6/2010  Serret Avila ......... G11B 23/284
                                                          713/189
2013/0267204 A1  10/2013  Schultz et al.
(Continued)

FOREIGN PATENT DOCUMENTS

CN      105245340      1/2016
EP      2490366        8/2012
(Continued)

OTHER PUBLICATIONS

International Search Report dated Sep. 13, 2018 in International Application No. PCT/GB2018/051761.
(Continued)

*Primary Examiner* — Hee K Song
(74) *Attorney, Agent, or Firm* — Knobbe, Martens, Olson & Bear, LLP (57) ABSTRACT

A method of using a user terminal to provide secure authenticated registration between a user and a third party, the method comprising: reading a chip to receive chip data stored on the chip (S408); transmitting the chip data, via a network interface of the user terminal, over a network to an authentication server associated with said third party (S410) and in response receiving via said network interface a notification message from the authentication server (S412); determining whether the identification document is authentic based on the notification message from the authentication server (S414), wherein in response to determining that the identification document is authentic, the method further comprising: outputting, via at least one output device of the
(Continued)

user terminal, an authentication challenge to the user (S418); receiving image data as a response to the authentication challenge (S420); and transmitting the image data, via the network interface, over the network to the authentication server for authenticating the user with the third party (S422).

27 Claims, 6 Drawing Sheets

(52) U.S. Cl.
CPC ........ *H04L 9/3271* (2013.01); *H04L 63/0861* (2013.01); *H04W 12/47* (2021.01); *H04L 2209/805* (2013.01)

(56) References Cited

U.S. PATENT DOCUMENTS

| | | | | |
|---|---|---|---|---|
| 2013/0305059 A1* | 11/2013 | Gormley | ............... | G06F 21/602 |
| | | | | 713/189 |
| 2014/0250515 A1* | 9/2014 | Jakobsson | ........... | H04W 12/068 |
| | | | | 726/7 |
| 2016/0080589 A1 | 3/2016 | Talwerdi | | |
| 2017/0213211 A1* | 7/2017 | Sibert | ................ | H04L 63/0861 |

FOREIGN PATENT DOCUMENTS

| | | | | |
|---|---|---|---|---|
| WO | WO 2016/120383 A1 | 8/2016 | | |
| WO | WO 2016/200416 | 12/2016 | | |
| WO | WO-2016200416 A1 * | 12/2016 | ............. | G06F 21/32 |
| WO | WO 2017/041716 | 3/2017 | | |

OTHER PUBLICATIONS

Office Action dated Nov. 5, 2020 for European Application No. 18737395.6 in 5 pages.

Search Report dated Dec. 11, 2017 for UK Application No. GB1710504.0 in 3 pages.

* cited by examiner

USER AUTHENTICATION BASED ON RFID-ENABLED IDENTITY DOCUMENT AND GESTURE CHALLENGE-RESPONSE PROTOCOL

CROSS-REFERENCE TO RELATED APPLICATIONS

This application is the U.S. National Phase under 35 U.S.C. § 371 of International Application No. PCT/GB2018/051761, filed Jun. 22, 2018, designating the United States and published in English on Jan. 3, 2019 as International Publication No. WO 2019/002832, which claims priority to United Kingdom Application No. 1710504.0, filed Jun. 30, 2017, each disclosure of which is incorporated herein by reference in its entirety.

TECHNICAL FIELD

The invention generally relates to a device, system and method for a secure user registration process.

BACKGROUND

As part of the giant move towards digitalisation a continued growth in the number of on-line services becomes available. Based on the recent eIDAS (electronic Identification and Trust Services for Electronic Transactions) regulation of the EU it is now possible to legally sign electronic documents using remote signing. In order for this to have the equivalence of a legally binding handwritten signature (the equivalence called a QES—Qualified Electronic Signature) strong authentication is used. Prior to authenticating a user, a trusted service provider must establish the identity of the signee. Whereas many organisations such as banks know the identity of their current customers there are many cases where the user initially is not known but needs to be identified and it is not possible to meet in person to identify the individual.

Currently there are solutions in place where people use device cameras to capture real time photos or videos of themselves together with their identification document (such as their passport, their national ID card or drivers license) in order to identify themselves and register with a service.

SUMMARY

The inventors have recognised that these current solutions are subject to fraud due to the ease of which it is possible to make a copy of a physical identification document and present it as an original. Furthermore the provider of the service must train and make available representatives to guide a customer through the registration process e.g. during a video call.

The present disclosure relates to a secure way of identifying and registering a user to an online service without the user having to meet (in person) a representative of the provider providing the service.

According to one aspect of the present disclosure there is provided a method of using a user terminal to provide secure authenticated registration between a user and a third party, the method comprising: reading a chip to receive chip data stored on the chip; transmitting the chip data, via a network interface of the user terminal, over a network to an authentication server associated with said third party and in response receiving via said network interface a notification message from the authentication server; determining whether the identification document is authentic based on the notification message from the authentication server, wherein in response to determining that the identification document is authentic, the method further comprising: outputting, via at least one output device of the user terminal, an authentication challenge to the user; receiving image data as a response to the authentication challenge; and transmitting the image data, via the network interface, over the network to the authentication server for authenticating the user with the third party.

The chip may be a radio frequency identification chip on an identification document associated with the user, and said reading comprises using a radio frequency identification reader of the user terminal to read a radio frequency identification chip on an identification document associated with the user, and in response receiving chip data stored on the radio frequency identification chip.

The method may further comprise: receiving, via at least one input device of the user terminal, identification information of the user, wherein said identification information is printed on the identification document associated with the user; transmitting data derived from the identification information from the radio frequency identification reader of the user terminal to the radio frequency identification chip on the identification document, and in response receiving the chip data stored on the radio frequency identification chip;

The at least one input device may comprise said camera, the method comprising: processing image data of an image of the identification document captured by the camera to detect the identification information; or processing image data captured by the camera whilst the identification document is in a field of view of the camera to detect the identification information.

In alternative embodiments, the user terminal comprises said chip, the method further comprises: receiving, via at least one input device of the user terminal, identification information of the user; and supplying the identification information to the chip, and in response receiving the chip data stored on the chip.

The at least one input device may comprise a keypad, wherein the identification information is entered by the user using the keypad.

The at least one output device may comprise a display to visually output the authentication challenge to the user.

The display may be touch sensitive and the at least one input device may comprise said touch-sensitive display, and wherein the identification information is entered by the user using the touch-sensitive display.

The at least one input device may comprise a microphone, and the identification information is audio data captured by the microphone.

The at least one input device may comprise a finger print scanner, and the identification information is image data captured by the finger print scanner.

The at least one output device may comprise a speaker to audibly output the authentication challenge to the user.

The authentication challenge may be randomly selected from a plurality of predetermined authentication challenges.

The method may further comprise: storing the plurality of predetermined authentication challenges in a memory of the user terminal; receiving a unique identifier, via a network interface of the user terminal, from the authentication server, the unique identifier randomly selected by the authentication server; and retrieving the authentication challenge associated with the unique identifier from the memory.

A notification message indicating that the identification document is authentic may comprise said unique identifier.

The unique identifier may be received separately to the notification message.

The method may comprise: receiving the authentication challenge, via a network interface of the user terminal, from the authentication server, the authentication challenge randomly selected by the authentication server.

A notification message indicating that the identification document is authentic may comprise said authentication challenge.

The authentication challenge may be received separately to the notification message.

The image data may be received using a camera of the user terminal.

The authentication challenge may request the user to perform a static or dynamic physical gesture.

The authentication challenge may request the user to read a portion of text.

The method may further comprise: receiving audio data using a microphone of the user terminal as a response to the authentication challenge; and transmitting the audio data, via the network interface, over the network to the authentication server for authenticating the user with the third party.

The authentication challenge may request the user to capture one or more images of one or both of their eyes using the camera.

The image data may be received using a finger print scanner of the user terminal.

The authentication challenge may request the user to capture one or images of a fingerprint of one or more of their fingers using the camera or the fingerprint scanner.

The method may further comprise: in response to transmitting the image data to the authentication server, receiving, via said network interface, a further notification message from the authentication server indicating whether the user has been successfully authenticated with the third party.

When the further notification message indicates that the user has been successfully authenticated with the third party, the method may further comprise enabling the user access to services provided by the third party.

When the further notification message indicates that the user has not been successfully authenticated with the third party, the method may further comprise: outputting, via the at least one output device of the user terminal, a further authentication challenge to the user; receiving image data as a response to the further authentication challenge; and transmitting the image data, via the network interface, over the network to the authentication server for authenticating the user with the third party.

According to another aspect of the present disclosure there is provided a user terminal for providing secure authenticated registration between a user and a third party, the user terminal comprising: a network interface; one or more processors configured to run an application associated with the third party, wherein the application is configured to: read a chip to receive chip data stored on the chip; transmit the chip data, via the network interface, over a network to an authentication server associated with said third party and in response receive, via said network interface, a notification message from the authentication server; determine whether the identification document is authentic based on the notification message from the authentication server, and in response to determining that the identification document is authentic, the application further configured to: output, via at least one output device of the user terminal, an authentication challenge to the user; receive image data as a response to the authentication challenge; and transmit the image data, via the network interface, over the network to the authentication server for authenticating the user with the third party.

According to another aspect of the present disclosure there is provided a computer program product for providing secure authenticated registration between a user and a third party, the computer program product comprising code embodied on a non-transient computer-readable medium and configured so as when executed on a processor of a user terminal to: read a chip to receive chip data stored on the chip; transmit the chip data, via a network interface of the user terminal, over a network to an authentication server associated with said third party and in response receive, via said network interface, a notification message from the authentication server; determine whether the identification document is authentic based on the notification message from the authentication server, and in response to determining that the identification document is authentic: output, via at least one output device of the user terminal, an authentication challenge to the user; receive image data as a response to the authentication challenge; and transmit the image data, via the network interface, over the network to the authentication server for authenticating the user with the third party.

According to another aspect of the present disclosure there is provided a method of using an authentication server to provide secure authenticated registration between a user and a third party associated with the authentication server, the method comprising: receiving from a user terminal, chip data that has been obtained from a radio frequency identification chip of an identification document associated with the user; determining authenticity of the identification document by comparing the chip data to data pre-stored in a data store; in response to determining that the identification document is authentic, transmitting a notification message to the user terminal indicating that the identification document is authentic; receiving image data as a response to an authentication challenge outputted to the user on the user terminal; determining authenticity of the user based on the image data and the chip data; and transmitting a further notification message to the user terminal indicating whether the user has been successfully authenticated with the third party.

According to another aspect of the present disclosure there is provided an authentication server for providing secure authenticated registration between a user and a third party associated with the authentication server, the authentication server configured to: receive from a user terminal, chip data that has been obtained from a radio frequency identification chip of an identification document associated with the user; determine authenticity of the identification document by comparing the chip data to data pre-stored in a data store; in response to determining that the identification document is authentic, transmit a notification message to the user terminal indicating that the identification document is authentic; receive image data as a response to an authentication challenge outputted to the user on the user terminal; determine authenticity of the user based on the image data and the chip data; and transmit a further notification message to the user terminal indicating whether the user has been successfully authenticated with the third party.

According to another aspect of the present disclosure there is provided a computer program product for providing secure authenticated registration between a user and a third party, the computer program product comprising code embodied on a non-transient computer-readable medium and configured so as when executed on a processor of an authentication server associated with the third party to: receive from a user terminal, chip data that has been obtained from a radio frequency identification chip of an identification document associated with the user; determine authenticity of the identification document by comparing the chip data to data pre-stored in a data store; in response to determining that the identification document is authentic, transmit a notification message to the user terminal indicating that the identification document is authentic; receive image data as a response to an authentication challenge outputted to the user on the user terminal; determine authenticity of the user based on the image data and the chip data; and transmit a further notification message to the user terminal indicating whether the user has been successfully authenticated with the third party.

According to another aspect of the present disclosure there is provided a system for providing secure authenticated registration between a user and a third party, the system comprising: the user terminal described herein and the authentication server described herein.

The invention further provides processor control code to implement the described systems and methods, for example on a general purpose computer system or on a digital signal processor (DSP). The code may be provided on a carrier such as a disk, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code. As the skilled person will appreciate, such code and/or data may be distributed between a plurality of coupled components in communication with one another.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Embodiments will now be described by way of example only.

Figure 1:
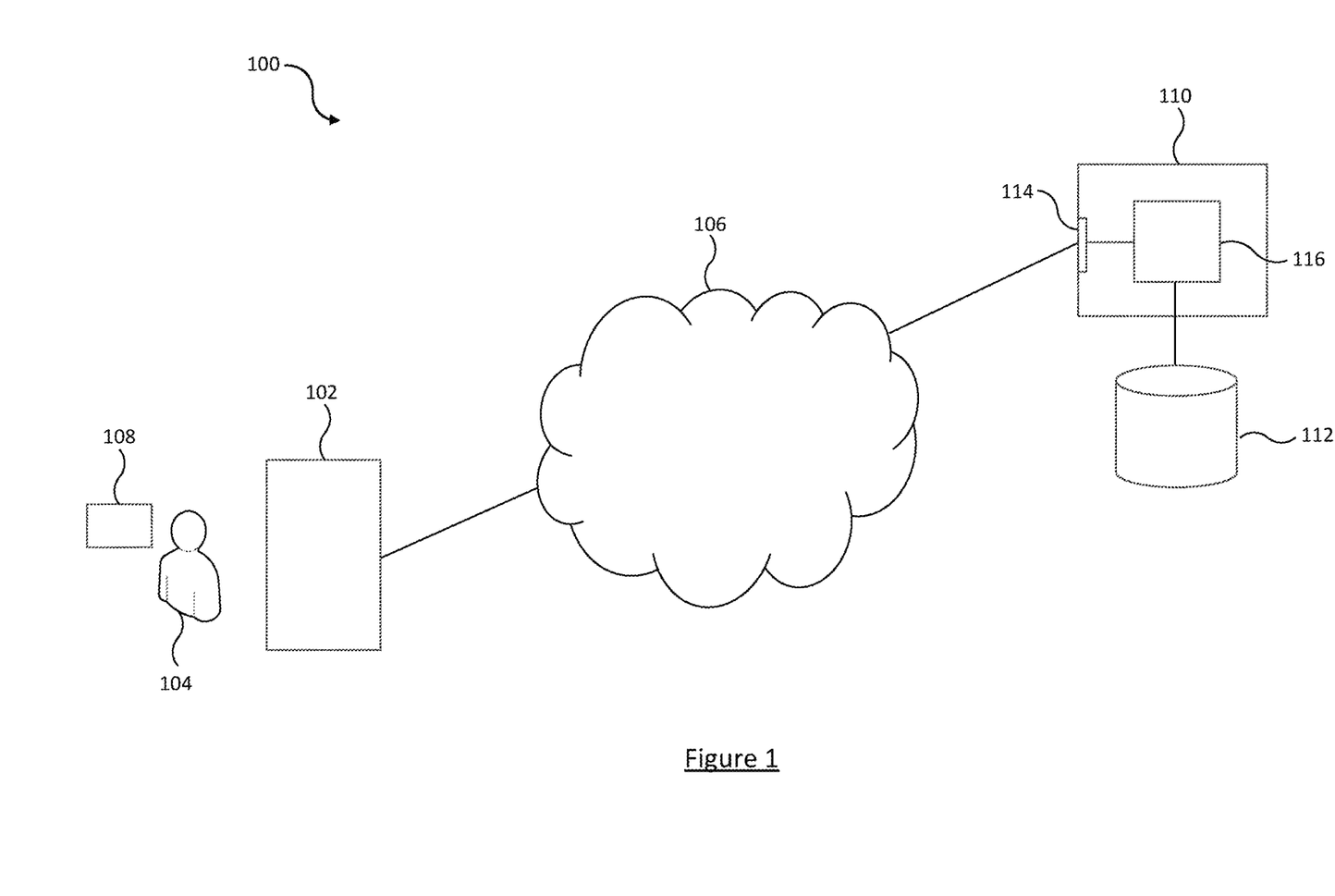
FIG. 1 illustrates a schematic block diagram of a system.

FIG. 1 shows a communication system 100 comprising a user A 104 who is associated with a user terminal 102, and an authentication server 110 which is coupled to at least one data store 112. Whilst the data store(s) 112 is shown in FIG. 1 as being external to the authentication server 110 in embodiments, the data store(s) 112 may be internal to the authentication server 110. The authentication server 110 comprises a network interface for transmitting and receiving data over the network 106 and one or more processor 116.

The user terminal 102 and authentication server 110 can communicate over a network 106 in the communication system 100. The network 106 may be any suitable network which has the ability to provide a communication channel, preferably secured, between the user terminal 102 and the authentication server 110. For example, the network 106 may be the Internet. In embodiments where the communication channel is secure the security properties of (only) the communication channel include the communication channel being authenticated with respect to the authentication server 110, and tamper evident (so that data cannot be independently changed without detection), and optionally being encrypted.

Note that in alternative embodiments, the user terminal 102 can connect to the network 106 via an additional intermediate network not shown in FIG. 1. For example, if the user terminal 102 is a mobile device, then it can connect to the network 106 via a cellular mobile network (not shown in FIG. 1).

The user terminal 102 may be, for example, a mobile phone, a personal digital assistant ("PDA"), a personal computer ("PC"), a tablet computer, a laptop computer, or other computing device able to connect to the network 106. The user terminal 102 is arranged to receive information from and output information to user A 104.

Whilst FIG. 1 shows only a single user (user A 104) for clarity, it will be appreciated that many more users and user terminals may be included in the communication system 100, and may communicate with the authentication server 110 over the communication system 100.

The user A 104 is associated with a physical identification document 108 which they may use in accordance with the embodiments describes herein to register themselves with a service that is provided by a service provider (third party) associated with the authentication server 110.

Figure 2:
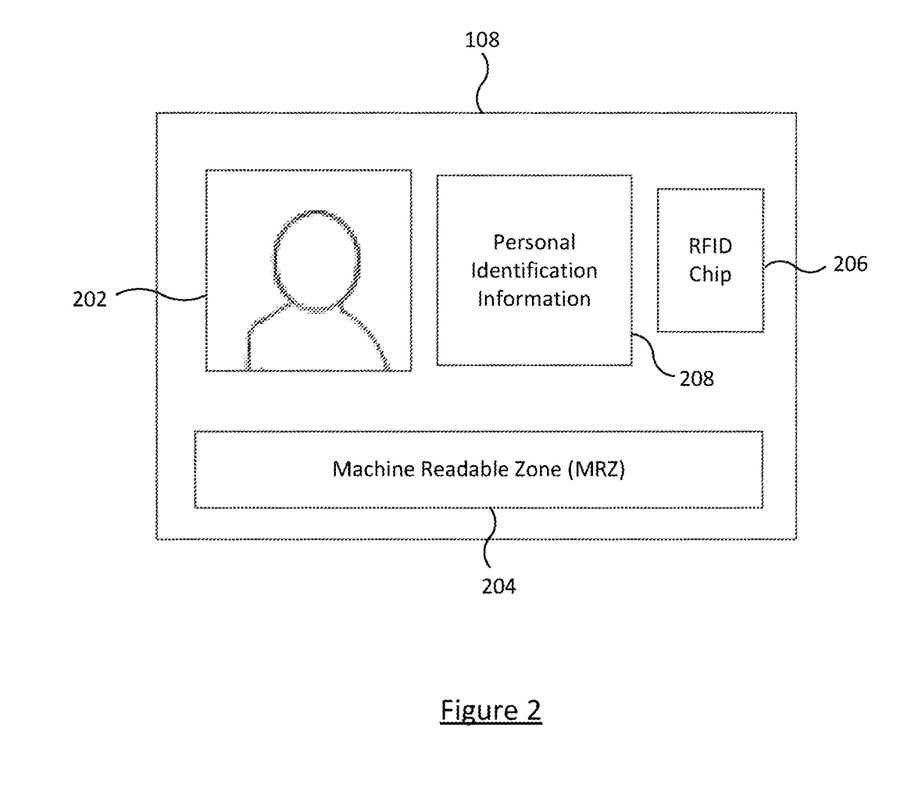
FIG. 2 illustrates an example identification document.

The identification document 108 is shown in more detail in FIG. 2.

As shown in FIG. 2, the identification document 108 includes an area on which a photograph 202 of the person to whom the identification document 108 has been issued to is shown. The identification document 108 further includes a Radio Frequency Identification (RFID) integrated circuit chip 206 (often referred to as a tag). The identification document 108 may take various forms, for example the identification document 108 may be a machine readable travel document (MRTD) such as a passport booklet or passport card, a driver's licence, an identity card, a health card or a professional body membership card.

The identification document 108 may further include a Machine-Readable Zone (MRZ) 204. The MRZ 204 displays alphanumeric characters (and may also include symbols) printed on the identification document 108 to provide information pertaining to the identification document 108. For example the alphanumeric characters printed in the MRZ 204 may indicate one or more of: (i) a name (of the holder of the identification document 108), (ii) nationality, (iii) date of birth, (iv) gender, (v) place of birth, (vi) identification document number, (vii) identification document expiry date, (viii) identification document issuance date, (ix) issuing country (or state) or organisation, and (x) a document type. The alphanumeric characters printed in the MRZ 204 may indicate other information not mentioned here but that would be apparent to persons skilled in the art.

Whilst example MRZ data is referred to above, embodiments of the present invention extend to any machine readable data that has been signed by a mutually trusted third party (e.g. a government), so health data, driving licence, credit report etc. Some but not necessarily all of the MRZ data may be printed in a more human intelligible manner in a personal identification area 208 of the identification document 108

The RFID chip 206 stores an electronic copy of information pertaining to the identification document 108. In particular the RFID chip 206 may store in electronic form, the MRZ data printed in the MRZ 204. The RFID chip 206 may also store information pertaining to the holder of the identification document 108 that is not printed in the MRZ 204, this information may include other names (of the holder of the identification document), height information, place of birth, categories of vehicle that the holder of the identification document are entitled to drive (in the example where the identification document is a driving licence) and/or information relating to convictions (in the example where the identification document is a driving licence) e.g. penalty points and how the penalty points arose etc.

Similarly, the RFID chip 206 may store information pertaining to the identification document 108 itself that is not printed in the MRZ 204. For example, the RFID chip 206 may store document type information, a code, identification document number, place of issuance of the identification document, identification document issuance date, identification document expiry date, visa information, travel record information, one or more cryptographic keys, and one or more digital certificates issued by a certification authority, information relating to the validity of such digital certificates, and/or one or more digital signatures.

The RF chip 206 also stores biometric information of a user (e.g. user A 104) which includes image data (facial image data) corresponding to the photograph 202 printed on the identification document 108. The biometric information may also include fingerprint biometric information, facial biometric information and/or iris biometric information associated with the user to which the identification document 108 has been issued to (e.g. user A 104). Other biometric information may also be stored on the RF chip 206.

Figure 3:
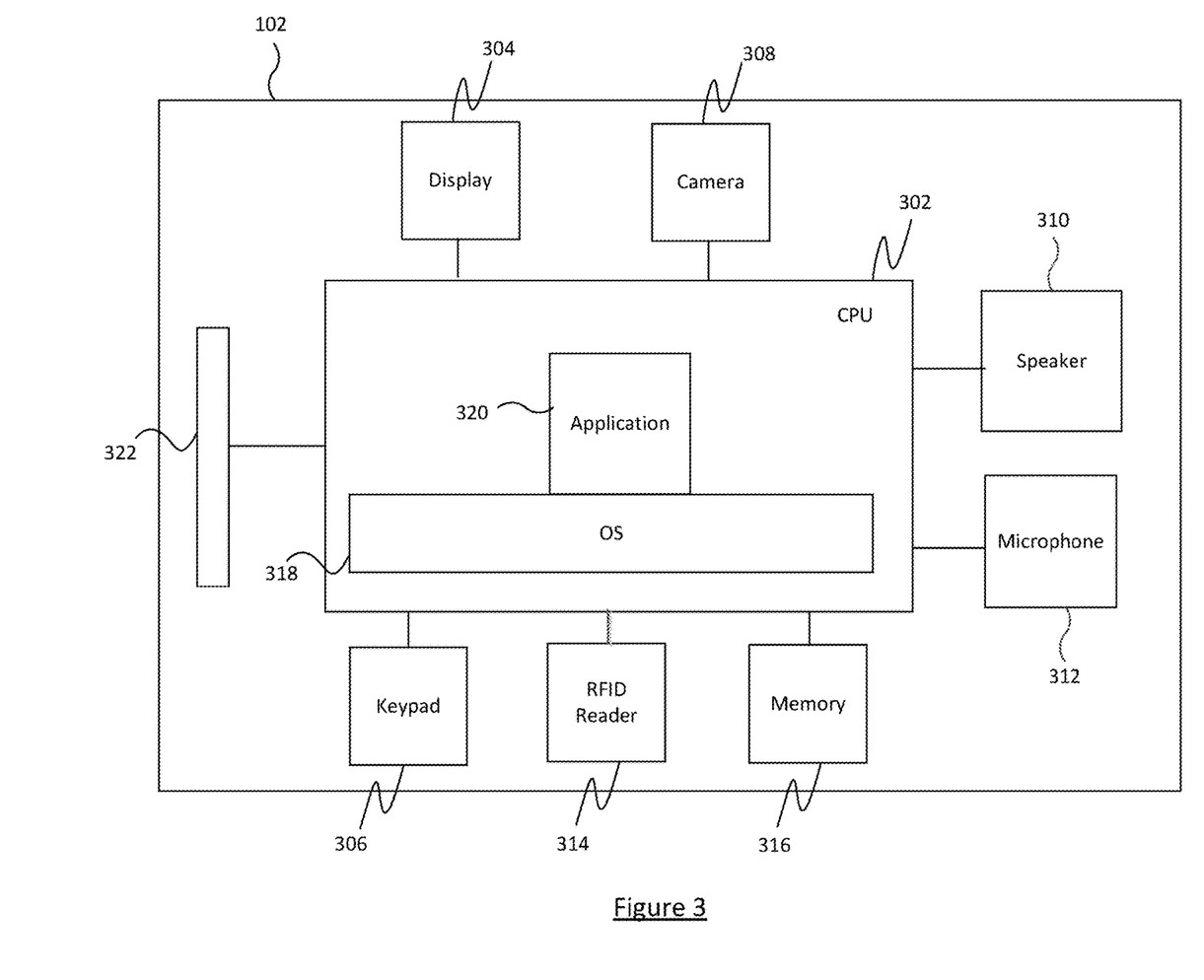
FIG. 3 illustrates a schematic block diagram of a user terminal in the system

FIG. 3 illustrates a detailed view of the user terminal 102 on which is executed an application 320 that is provided by a service provider associated with the authentication server 110. The application 320 may provide one or more services such as an electronic voting service, a banking service, access to government records, signing up for a mobile phone contract, online examinations and more.

The user terminal 102 comprises a central processing unit ("CPU") 302, to which is connected a display 304. Whilst FIG. 3 shows one CPU, as an alternative the user terminal 102 may comprise more than one CPU e.g. which constitute cores of a multi-core processor. The display 304 may be touch-sensitive and therefore act as an input device of the user terminal 102. The user terminal 102 further comprises a camera 308 which may be integrated into the user terminal 102, or coupled to the user terminal via a wired or wireless connection. The user terminal 102 also comprises a memory 316 for storing data as is known in the art.

The user terminal 102 may comprise a keypad 306 and/or an output audio device 310 (e.g. a speaker) and/or an input audio device 312 (e.g. a microphone) connected to the CPU 202, which may be integrated into the user terminal 102 or coupled to the user terminal via a wired or wireless connection.

As shown in FIG. 3, the user terminal comprises an RFID reader 314 integrated into the user terminal 102 or coupled to the user terminal via a wired or wireless connection. As is well known to persons skilled in the art, RFID is the method of uniquely identifying items using radio waves. An RFID reader sends an interrogating signal to a tag and the tag responds with its unique information. In one implementation, the RFID reader 314 is a near-field communication (NFC) reader. As is known in the art, current near-field communication devices operate at the same frequency (13.56 MHz) as high frequency (HF) RFID readers and tags. As will become apparent, it is advantageous if the RFID reader 314 is an NFC reader because, due to the short read range limitations of its radio frequency, the NFC reader and tag must be in close proximity to each other to communicate, typically a few centimeters.

The CPU 202 is connected to a network interface 322 such as a modem for communication with the communication network 106.

The user terminal 102 is installed with the application 320 that has identity verification functionality described in more detail below, in particular the application 320 is stored in the memory 316 and arranged for execution on the CPU 202. FIG. 3 also illustrates an operating system ("OS") 318 executed on the CPU 302. Running on top of the OS 318 is the application 320 referred to above.

Figure 4A:
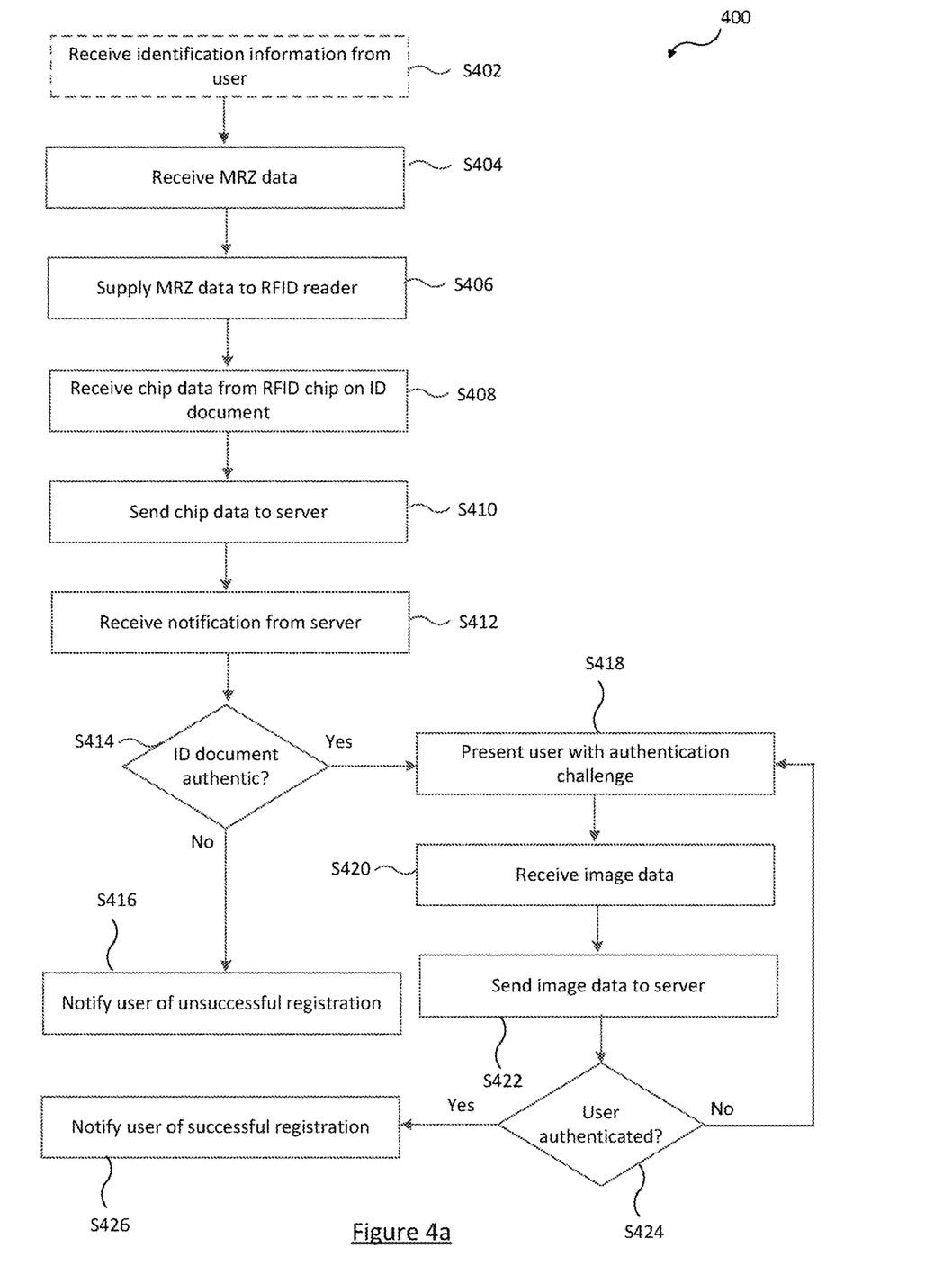
FIG. 4a is flow chart for a process performed by an application when executed on the user terminal.

Reference is now made to FIG. 4a which is a flow chart for a process 400 performed by the application 320 when executed on the user terminal 102.

As an optional first step the application 320 may ask user A 104 to enrol (identify him or herself) by entering user identification information (e.g. a telephone number, an email address, a postal address, a company registration number, a personal identification number). For example a user interface provided by the application 320 that is displayed on display 304 may display text requesting the user identification information. Additionally or alternatively, the application 320 may output an audible prompt via speaker 310. Thus at optional step S402, the application 320 may receive user identification information provided by user A 104. User A 104 may enter the user identification information using a suitable input device such as keypad 306 or touching areas of the display 204 if the display 204 is a touch screen using their finger or other computing instrument (such as a stylus). Other user identification received at step S402 may include image data of a utility bill or bank statement (or other relevant document in line with legal requirements) associated with the user A 104 that has been captured using camera 308 or scanned in using an appropriate peripheral device coupled to the user terminal 102. This user identification information can be transmitted from the user terminal 102 over the network 106 to the authentication server 110.

At step S404, the application 320 receives MRZ data corresponding to the MRZ data printed in the MRZ 204 on the identification document 108.

User A 104 may enter the MRZ data manually using a suitable input device such as keypad 306 or touching areas of the display 204 if the display 204 is a touch screen. A more convenient way is to use the camera 308 of the user terminal 102.

Figure 4B:
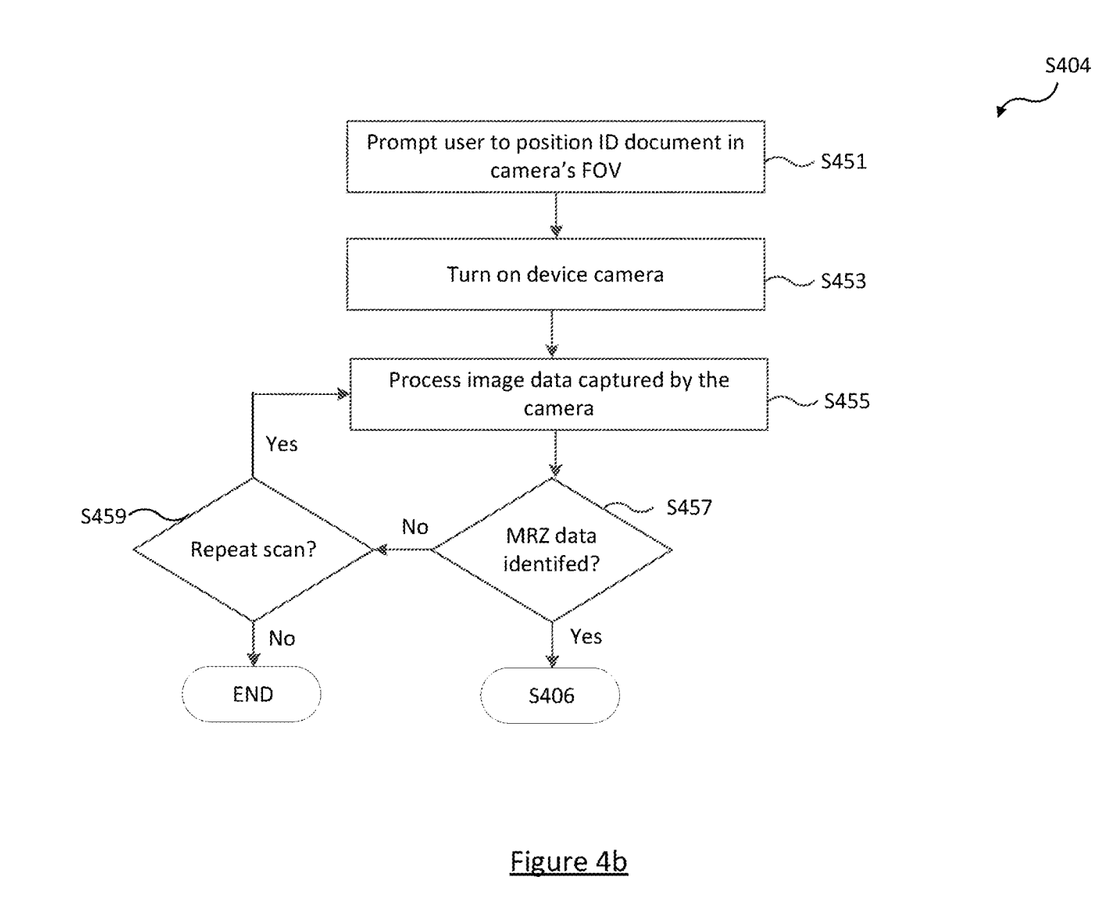
FIG. 4b is flow chart for a process illustrating how the user terminal may receive data printed on the identification document.

FIG. 4b illustrates a flow chart performed by the application 320 when executed on the user terminal 102 in order to receive the MRZ data.

At step S451, the application 320 asks user A 104 to position the identification document 108 so that it (in particular the photograph 202) is in the field of view of the camera 308. For example the user interface provided by the application 320 that is displayed on display 304 may display text providing suitable instruction. Additionally or alternatively, the application 320 may output an audible prompt via speaker 310.

At step S453, the application 320 activates (switches on) the camera 308. Activation of the camera 308 may be automatic or in response to user A 104 confirming that the identification document 108 is positioned in the field of view of the camera 308.

At step S455, the application 320 processes (scans) image data captured by the camera 308 using optical character recognition techniques in an attempt to identify MRZ data. The processing performed at step S455 may be implemented on a single frame of image data i.e. on an image that has been captured by the camera 308 in response to a user making a selection (i.e. a selection to capture a picture using the camera 308). Alternatively, the processing performed at step S455 may be implemented dynamically on image data captured by the camera 308 as user A 104 holds the identification document in the camera's field of view without the user making a selection to capture a picture using the camera 308.

If at step S457, the application 320 determines that MRZ data has been successfully identified then the process 400 proceeds to step S406 (described below with reference to FIG. 4a).

If at step S457 the application 320 determines that MRZ data has not been successfully identified, then the process 400 proceeds to step S459.

At step S459, the application 320 asks user A 104 if they wish to repeat the scanning process for example by displaying a message in the user interface provided by the application 320 that is displayed on display 304. If the application 320 receives a selection from user A 104 indicating that the scanning process is to be repeated the process 400 proceeds back to step S455 otherwise the process 400 ends.

It will be appreciated that using the camera 308 of the user terminal 102 to optically receive the MRZ data provides a quicker and more reliable method of entering the MRZ data into the application 320 than the manual method.

Referring back to FIG. 4a, once the application 320 receives the MRZ data, at step S406 the application 320 supplies the MRZ data to the RFID reader 314 for use in communicating with the RFID chip 206 on the identification document 108.

The RFID chip 206 reveals its contents only after a reader successfully authenticates itself as being authorized to receive that information (to prevent unauthorised reading of the chip data). Thus to gain access to the data stored on the RFID chip 206, the RFID reader 314 engages in a challenge response protocol with the RFID chip 206.

In particular, in general terms, the RFID reader 314 derives data from the received MRZ data and wirelessly transmits this derived data to the RFID chip 206 to authenticate the RFID reader 314 and unlock the data (referred to herein as "chip data") stored on the RFID chip 206.

The data transmitted from the RFID reader 314 to the RFID chip 206 to authenticate the reader is an encrypted and message-authenticated data package protected by keys which are derived from the MRZ data.

An RFID chip that is protected by the Basic Access Control (BAC) mechanism denies access to its contents unless the inspection system (e.g. RFID reader) can prove that it is authorized to access the chip. This proof is given in a challenge-response protocol, where the inspection system proves knowledge of the chip-individual Document Basic Access Keys ($K_{ENC}$ and $K_{MAC}$) which are derived from information from the MRZ.

Whilst BAC is referred to herein, this is just one example of an access control mechanism which may be used in embodiments of the present invention, and embodiments of the present invention extend to other access control mechanisms such as Extended Access Control (EAC), Supplemental Access Control (SAC), and other access control mechanisms known to persons skilled in the art Once authentication is successful, the RFID chip 206 releases the chip data stored thereon and the RFID reader 314 downloads the chip data to the user terminal 102 where it is received by the application 320 at step S408.

At step S410, the application 320 outputs the chip data for transmission via network interface 322 to the authentication server 110. The chip data is transmitted from the user terminal 102 over the network 106 to the authentication server 110 in raw or in encrypted form. The application 320 may encrypt the chip data itself or may output the chip data to an encryption module (not shown in FIG. 3) on the user terminal 102 to handle the encryption of the chip data prior to the chip data being transmitted to the authentication server 110. Any encryption algorithm known to persons skilled in the art may be used to encrypt the chip data, for example the Advanced Encryption Standard (AES) or Triple-DES are examples of encryption algorithms which may be used to encrypt the chip data.

The authentication server 110 performs a back-end check of the authenticity of the identification document 108 (described in more detail below with reference to FIG. 5) and transmits a notification with the results of the authenticity check back to the user terminal 102.

At step S412, the application 320 receives, via the network interface 322, the notification transmitted from the authentication server 110.

The application 320 reads the notification received from the authentication server 110 at step S414 to determine whether or not the identification document 108 is authentic (and valid i.e. has not expired). If the notification received from the authentication server 110 indicates that the identification document 108 is not authentic (or has expired), the process 400 proceeds to step S416 where the application 320 notifies the user of an unsuccessful registration to the services provided by the application 320. For example the user interface provided by the application 320 that is displayed on display 304 may display text informing user A 104 of the unsuccessful registration.

If the notification received from the authentication server 110 indicates that the identification document 108 is authentic (and valid i.e. has not expired), the application 320 then takes steps to verify that the user that is attempting to register with the service provider associated with the application 320 is the person to whom the authentic identification document 108 has been issued to.

To do this, at step S418 the application 320 presents user A 104 with an authentication challenge to which user A 104 must respond to. For example the user interface provided by the application 320 that is displayed on display 304 may display text informing user A 104 of the authentication challenge or the application 320 may output an audible prompt via speaker 310. The authentic challenge is a real time authentication challenge in that it is associated with a predetermined period in which a user must provide a response after which the authentication challenge times out and a response to the authentication challenge provided after the expiry of the predetermined period is not accepted as a response to the authentication challenge. Furthermore a user is prevented from replaying the authentication challenge.

The authentication challenge is randomly selected from a plurality of predetermined authentication challenges by the authentication server 110 and communicated to the user terminal 102. This may be implemented in various ways.

The data store(s) 112 stores the plurality of predetermined authentication challenges which are accessible by the authentication server 110.

In one variant, the application 320 additionally stores the plurality of predetermined authentication challenges in memory 316 of the user terminal 102 and the authentication server 110 knows unique identifiers of the predetermined authentication challenges. In this embodiment, upon determining that the identification document 108 is authentic the authentication server 110 randomly selects one of the predetermined authentication challenges and transmits a unique identifier corresponding to the randomly selected authentication challenge to the user terminal 102. For example, the plurality of predetermined authentication challenges stored in memory 316 and in the data store(s) 112 may be numbered and the authentication server 110 knowing there is n predetermined authentication challenges that are stored in both memory 316 and in the data store(s) 112, randomly selects a number between 1 and n and communicates the randomly selected number to the user terminal 102. The application 320 is configured, in response to receiving the unique identifier, to retrieve the authentication challenge corresponding to the unique identifier from memory 316 and presents it to the user. It will be appreciated that numbering of the predetermined authentication challenges is just one way that the predetermined authentication challenges may be uniquely identified, and other techniques are possible. The unique identifier of the randomly selected authentication challenge may be included in the notification transmitted from the authentication server 110 that is received at the user terminal 102 at step S412 or may be included in a separate message transmitted from the authentication server 110 to the user terminal 102.

In another variant, upon determining that the identification document 108 is authentic the authentication server 110 accesses the data store 112 and randomly selects one of the predetermined authentication challenges that are stored in the data store 112 and transmits the randomly selected authentication challenge to the user terminal 102. The randomly selected authentication challenge may be included in the notification transmitted from the authentication server 110 that is received at the user terminal 102 at step S412 or may be included in a separate message transmitted from the authentication server 110 to the user terminal 102. This provides a more secure method of presenting a randomly selected authentic challenge because the plurality of predetermined authentication challenges are not stored in memory 316 of the user terminal 102 thus preventing any possible access to the predetermined authentication challenges from a fraudulent person attempting to present themselves as the person identified on the authentic identification document 108. It can be envisaged that such a fraudulent person may attempt to access the predetermined authentication challenges to have knowledge of them and thus prepare suitable responses in advance of one of the authentication challenges being presented to them.

Once the application 320 has presented user A 104 with an authentication challenge, the application 320 activates one or more input device on the user terminal 102 to receive the response by user A 104 to the authentication challenge.

At step S420, the application 320 receives image data (and optionally additional forms of data) from the activated input device.

The image data may take various forms, as will be described in more detail below.

In one embodiment, the authentication challenge requests a user to perform a physical gesture and the application 320 activates the camera 308 to capture user A 104 performing the gesture whilst also capturing the face of user A.

If the authentication challenge requests a user to present their face in the field of view of the camera 308 and perform a static physical gesture such as "show your right hand to the camera with the three fingers raised" or "make fists with both of your hands", the image data received at step S402 from the camera 308 may comprise a single image (e.g. a photograph) or comprise multiple images (e.g. a video). It will be appreciated that if the authentication challenge requests a user to perform a dynamic physical gesture such as "clap your hands" or "wave your right hand from side to side", the image data received at step S402 from the camera 308 will comprise multiple images (e.g. a video).

In another embodiment, the authentication challenge requests a user to present their face in the field of view of the camera 308 and read a portion of text (e.g. a sentence or passage) such as "the flowers bloom in spring" and the application 320 activates the microphone 312 to record user A 104 saying the sentence, and activates the camera 308 capture the face of user A whilst they are saying the sentence. It will be appreciated that in this embodiment, the image data received at step S402 from the camera 308 will comprise multiple images (e.g. a video). It will be appreciated that in this embodiment, in addition to image data, audio data is received by the application 320 at step S420.

If the chip data received at step S408 comprises fingerprint biometric information, in another embodiment the authentication challenge requests a user to position one or more of their fingers in the field of view of camera 308 and activates the camera 308 to capture one or more images of the user's fingerprints which are then supplied to the application 320. If the user terminal 102 comprises a fingerprint scanner (not shown in FIG. 3), the application 320 may activate the fingerprint scanner to capture one or more images of the user's fingers which are then supplied to the application 320. The fingerprint scanner may be an optical scanner, a capacitive scanner, an ultrasonic scanner or other fingerprint scanner known to persons skilled in the art.

If the chip data received at step S408 comprises iris biometric information, in another embodiment the authentication challenge requests a user to position one or both of their eyes in the field of view of camera 308 and activate the camera 308 to capture one or more images of the user's eye(s) which are then supplied to the application 320.

In embodiments, a response to the authentication challenge is to be provided within a certain period of time. Thus the authentication challenge can be considered as a real-time authentication challenge.

At step S422, the application 320 outputs the image data for transmission via network interface 322 to the authentication server 110. The image data is transmitted from the user terminal 102 over the network 106 to the authentication server 110 in raw or in encrypted form. The application 320 may encrypt the image data itself or may output the chip data to the encryption module referred to above (not shown in FIG. 3) on the user terminal 102 to handle the encryption of the image data prior to the image data being transmitted to the authentication server 110.

It will be appreciated that in embodiments whereby microphone 312 is used to capture the user's response to the authentication challenge, audio data is also transmitted to the authentication server 110.

The authentication server 110 performs a back-end check of the authenticity of the user based on the data it receives from the user terminal 102 in response to the authentication challenge and at least the chip data received from the user terminal 102 (described in more detail below with reference to FIG. 5). That is, the authentication server 110 checks that the user providing the response to the authentication challenge, is the person to whom the authentic identification document 108 has been issued to. At step S424, the application 320 receives, via the network interface 322, a further notification message transmitted from the authentication server 110.

The application 320 reads the further notification message received from the authentication server 110 to determine whether or not the response to the authentication challenge has successfully authenticated the user.

If the further notification message received from the authentication server 110 indicates that the user has been successfully authenticated, the process 400 proceeds to step S426 where the application 320 notifies the user of a successful registration to the services provided by the application 320. For example the user interface provided by the application 320 that is displayed on display 304 may display text informing user A 104 of the successful registration or the application 320 may provide the notification by merely providing the user with access to functionality that was restricted prior to the registration process 400 being performed Once the application 320 has identified that (i) the identification document 108 is authentic; and (ii) the user registering with the service provider associated with the application 320 is the person to whom the authentic identification document 108 has been issued to, the application 320 enables the user to access and use functionality (e.g. a service) provided by the application 320.

If the further notification message received from the authentication server 110 indicates that the user has not been successfully authenticated the process 400 may proceed in various ways. In one embodiment, as shown in FIG. 4a the process 400 proceeds back to step S418 where the application 320 presents user A 104 with another authentication challenge to which user A 104 must respond to (which may be selected in accordance with one of the ways described above).

In another embodiment, the application 320 notifies the user that they must register to use the services provided by service provider manually by meeting (either physically in person or via a live video phone call/conference) a representative of the provider providing the service.

In another embodiment, the application 320 receives a short message service-based (SMS-based) one-time-passcode, via the network interface 322, that is transmitted from the authentication server 110. The authentication server 110 is able to send the SMS OTP to the user terminal 102 if it has been provided with the telephone number associated with the user terminal 102 (for example if it was provided by the user at step S402 or a trustworthy entity, such as Experian, so that a name, an address a telephone number and identification document all tie together). In this embodiment, upon entry of the SMS OTP in the application 320, the application 320 enables the user to access and use functionality (e.g. service) provided by the application 320.

Figure 5:
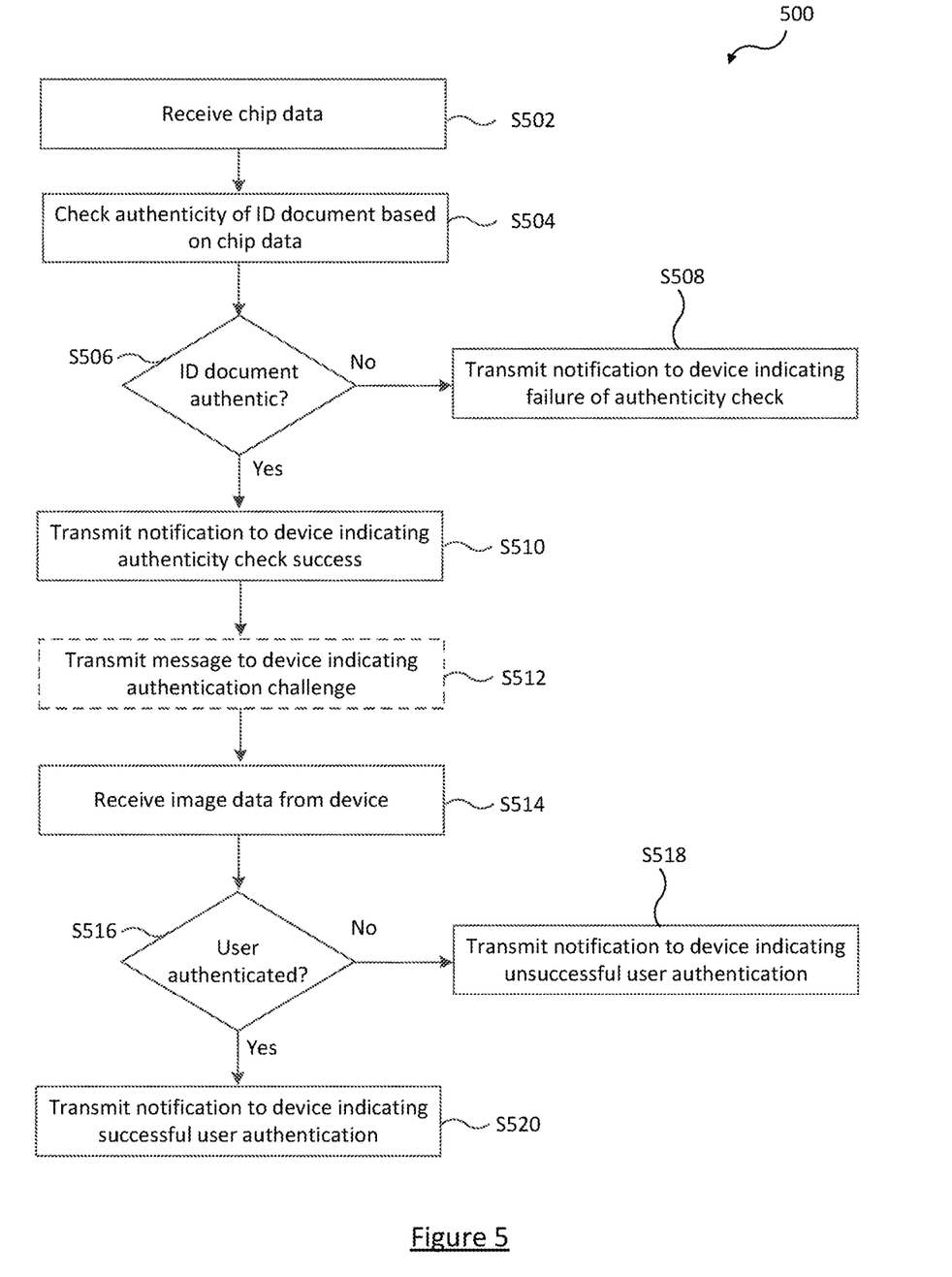
FIG. 5 is flow chart for a process performed by an authentication server.

Reference is now made to FIG. 5 which illustrates a flow chart of a process 500 performed by the authentication server 110. The steps of the process 500 are carried out on processor 116 of the authentication server 110.

At step S502, the authentication server 110 receives the chip data that is transmitted over the network 106 by the user terminal 102 (at step S410).

The authentication server 110 stores the chip data in the data store(s) 112. The data store(s) 112 stores identification document information which can be used to identify the authenticity of an identification document. Expressed another way, the identification document information comprises information relating to authentic identification documents.

At step S506, the authentication server 110 compares the chip data with the identification document information stored in the data store 112 to determine whether the identification document 108 is authentic or not. For example, at step S506 the authentication server 110 may check the digital certificate included in the chip data against a list of authentic digital certificates associated with the issuer of the identification document 108 that is stored in the data store(s) 112 to check that the identification document 108 is authentic. In the case of the identification document 108 being a passport issued by the United Kingdom, the identification document information data store(s) 112 includes a list of authentic certificates issued by the United Kingdom against which the digital certificate included in the chip data is checked against, The check performed at step S506 also comprises checking the expiry date of the identification document 108 that is included in the chip data against the current date to check whether the identification document 108 is still valid (i.e. hasn't expired).

The authentication server 110 transmits a notification with the results of the authenticity check over the network 106 back to the user terminal 102.

If the authentication server 110 determines at step S506 that the identification document 108 is not authentic (or has expired) the process 500 proceeds to step S508 where the authentication server 110 transmits a notification to user terminal 102 which indicates that the identification document 108 is not authentic (or has expired).

If the authentication server 110 determines at step S506 that the identification document 108 is authentic (and valid i.e. has not expired) the process 500 proceeds to step S510 where the authentication server 110 transmits a notification to user terminal 102 which indicates that the identification document 108 is authentic (and valid i.e. has not expired).

As explained above, in embodiments it is the authentication server 110 that randomly selects the authentic challenge that is to be presented to user A 104.

As described above, in one variant the application 320 additionally stores the plurality of predetermined authentication challenges in memory 316 of the user terminal 102 and the authentication server 110 stores unique identifiers of the predetermined authentication challenges in the data store 112 in addition to the predetermined authentication challenges themselves. In this embodiment, upon determining that the identification document 108 is authentic the authentication server 110 randomly selects one of the predetermined authentication challenges and transmits a unique identifier corresponding to the randomly selected authentication challenge to the user terminal 102. As shown in FIG. 5, the unique identifier of the randomly selected authentication challenge may be included in a separate message transmitted from the authentication server 110 to the user terminal 102 at step S512 or may be included in the notification transmitted to the user terminal 102 at step S510.

As described above, in another variant, upon determining that the identification document 108 is authentic the authentication server 110 accesses the data store 112 and randomly selects one of the predetermined authentication challenges that are stored in the data store 112 and transmits the randomly selected authentication challenge to the user terminal 102. The randomly selected authentication challenge may be included in the notification transmitted from the authentication server 110 to the user terminal 102 at step S510 or may be included in a separate message transmitted from the authentication server 110 to the user terminal 102 at step S512.

At step S514, the authentication server 110 receives image data from the user terminal 102 as a response to the authentication challenge.

The authentication server 110 at step S516 performs a back-end check of the authenticity of the user based on the data it receives from the user terminal 102 in response to the authentication challenge and at least the chip data received from the user terminal 102. That is, at step S516 the authentication server 110 checks that the user providing the response to the authentication challenge, is the person to whom the authentic identification document 108 has been issued to. It will be apparent that the authentication performed by the authentication server 110 relies on external data e.g. the chip data (that is independently certified by an entity that is mutually trusted).

In embodiments whereby the authentication challenge requests a user to perform a physical gesture, at step S516 the authentication server 110 processes the received image data and using image processing techniques compares it to the facial image data included in the chip data to determine whether the user providing the response to the authentication challenge is the person to whom the identification document 108 has been issued to. In these embodiments, at step S516 the authentication server 110 also processes the received image data using gesture recognition techniques to determine whether the physical gesture has been performed.

The authentication server 110 will successfully authenticate the user if the authentication server 110 determines that (i) the received image data (comprising facial image data) matches the facial image data included in the chip data, and (ii) the physical gesture has been performed.

In embodiments whereby the authentication challenge requests a user to read a portion of text (e.g. a sentence or passage) at step S514 the authentication server 110 additionally receives audio data from the user terminal 102 as a response to the authentication challenge. In these embodiments, at step S516 the authentication server 110 processes the received image data and compares it to the facial image data included in the chip data to determine whether the user providing the response to the authentication challenge is the person to whom the identification document 108 has been issued to. The authentication server 110 additionally processes the received audio data using audio recognition techniques to determine whether the user has read the portion of text.

The authentication server 110 will successfully authenticate the user if the authentication server 110 determines that (i) the received image data (comprising facial image data) matches the facial image data included in the chip data, and (ii) the user has read the portion of text.

In the above embodiments, the requirement for the user to perform a randomly selected gesture or read a randomly selected portion of text in addition to presenting their face in the field of view of the camera 308 in response to the authentication challenge, prevents a fraudulent person who has obtained another person's identification document from presenting a photograph or video (displayed on another device) to the camera 308 in response to the authentication challenge and passing the authentication challenge. It will be appreciated that the types of authentication challenge mentioned herein, whereby a user must carry out a randomly selected act in addition to presenting their face in the field of view of the camera 308, are merely examples and embodiments extend to other acts that can be envisaged by persons skilled in the art.

In other embodiments at step S516 the authentication server processes the received image data to verify whether biometric information (fingerprint and/or iris biometric information) captured in the image data matches the biometric information included in the chip data to verify the authenticity of the user who provided the response to the authentication challenge.

If the authentication server 110 successfully authenticates the user at step S516, the process 500 proceeds to step S520 where the authentication server transmits a further notification over the network 106 to the user terminal 102 indicating successful authentication (that the user has been successfully authenticated).

If the authentication server 110 does not successfully authenticate the user at step S516, the process 500 proceeds to step S518 where the authentication server transmits a further notification over the network 106 to the user terminal 102 indicating unsuccessful authentication (that the user has not been successfully authenticated).

It will be appreciated that the above described embodiments provide a secure way of identifying and registering people without meeting them in person.

Whilst embodiments have been described above with reference to the RFID reader 314 supplying MRZ data 204 to the RFID chip 206 to unlock the chip data store thereon, in other embodiments the RFID chip 206 can be read without the RFID reader 314 feeding a password to unlock it. In these other embodiments, the RFID reader 314 merely has to transmit a request for the chip data stored on the RFID chip 206 in order to receive as a reply, the chip data stored on the RFID chip 206. Thus it will be apparent that in these embodiments steps S404 and S406 are not performed.

In yet further embodiments, the RFID chip 206 is locked with a password but the RFID chip 206 is not MRZ compliant (the chip data stored on the RFID chip 206 cannot be unlocked by supplying data derived from MRZ data to the RFID chip 206). In these further embodiments, the RFID reader 314 has to transmit another type of password to the RFID chip 206 in order to receive as a reply, the chip data stored on the RFID chip 206. Thus it will be apparent that in these embodiments steps S404 and S406 are not performed.

Whilst embodiments have been described above with reference to reading a RFID chip 206 of a physical identification document to obtain the chip data stored thereon, in other embodiments the chip data is stored electronically in digital form on a chip on the user terminal (this is not shown in FIG. 3) such that the user terminal 102 stores an electronic identification document. In these embodiments the chip is secure data storage module on the user terminal 102 which stores the electronic identification document and associated chip data. Access to the chip data stored in the secure data storage module is controlled by an access control component (which may be implemented in software, firmware, hardware, or a combination thereof) on the user terminal 102 which may be an internal component of the secure data storage module or an external component of the secure data storage module. In these embodiments, the application 320 receives via at least one input device of the user terminal 102, identification information of the user, and supplies the identification information to the access control component on the user terminal. Upon supplying identification information that matches preconfigured identification information of the user stored on the secure data storage module, the application 320 receives the chip data stored on the secure data storage module from the access control component.

In one example, the user may enter a pincode (identification information) to unlock to access the chip data stored on the secure data storage module which may be entered using a suitable input device such as keypad 306 or touching areas of the display 204 if the display 204 is a touch screen using their finger or other computing instrument (such as a stylus). In another example, the user may speak into microphone 312 and audio data (identification information) captured by the microphone is used to access the chip data stored on the secure data storage module based on voice recognition processing implemented by the access control component. In yet another example, the user may use a fingerprint scanner to capture one or more images of the user's finger(s) and this image data (identification information) captured by the fingerprint scanner is used to access the chip data stored on the secure data storage module based on image processing implemented by the access control component.

It will be appreciated that these examples are merely provided to illustrate the concept and these embodiments extend to other types of identification information and input device that the persons skilled in the art could envisage using to access chip data that is securely stored on the secure data storage module of the user terminal.

The term "application" as used herein generally represent software, firmware, hardware, or a combination thereof. In the case of a software implementation, the functionality or application represents program code that performs specified tasks when executed on a processor (e.g. CPU or CPUs). The program code can be stored in one or more computer readable memory devices. The "application" can also be implemented as a web browser (e.g. a javascript-enabled web browser) installed on the user terminal.

While this invention has been particularly shown and described with reference to preferred embodiments, it will be understood to those skilled in the art that various changes in form and detail may be made without departing from the scope of the invention as defined by the appendant claims.

What is claimed is:

1. A method of using a user terminal to provide secure authenticated registration between a user and a third party, wherein the user is associated with the user terminal, the method comprising:
    reading a chip to receive chip data stored on the chip;
    transmitting the chip data, via a network interface of the user terminal associated with the user, over a network to an authentication server associated with said third party and in response receiving via said network interface a notification message from the authentication server;
    determining whether an identification document associated with the chip data is authentic based on the notification message from the authentication server, wherein in response to determining that the identification document is authentic, the method further comprising:
    outputting, via at least one output device of the user terminal, an authentication challenge to the user associated with the user terminal;
    receiving image data as a response to the authentication challenge; and
    transmitting the image data, via the network interface, over the network to the authentication server for authenticating the user with the third party.

2. A method according to claim 1, wherein the chip is a radio frequency identification chip on an identification document associated with the user, and said reading comprises using a radio frequency identification reader of the user terminal to read a radio frequency identification chip on an identification document associated with the user, and in response receiving chip data stored on the radio frequency identification chip.

3. A method according to claim 2, wherein the method further comprises:
    receiving, via at least one input device of the user terminal, identification information of the user, wherein said identification information is printed on the identification document associated with the user;
    transmitting data derived from the identification information from the radio frequency identification reader of the user terminal to the radio frequency identification chip on the identification document, and in response receiving the chip data stored on the radio frequency identification chip.

4. A method according to claim 3, wherein the at least one input device comprises a camera, the method comprising:
    processing image data of an image of the identification document captured by the camera to detect the identification information; or
    processing image data captured by the camera whilst the identification document is in a field of view of the camera to detect the identification information.

5. A method according to claim 3, wherein the at least one input device comprises a keypad, wherein the identification information is entered by the user using the keypad.

6. A method according to claim 3, wherein the at least one input device comprises a microphone, and the identification information is audio data captured by the microphone.

7. A method according to claim 1, wherein the user terminal comprises said chip, the method further comprises:
    receiving, via at least one input device of the user terminal, identification information of the user; and
    supplying the identification information to the chip, and in response receiving the chip data stored on the chip.

8. A method according to claim 7, wherein the at least one input device comprises a finger print scanner, and the identification information is image data captured by the finger print scanner.

9. A method according to claim 1, wherein the at least one output device comprises a display to visually output the authentication challenge to the user.

10. A method according to claim 1, wherein the authentication challenge is randomly selected from a plurality of predetermined authentication challenges.

11. A method according to claim 10, wherein the method comprises:
    storing the plurality of predetermined authentication challenges in a memory of the user terminal;
    receiving a unique identifier, via a network interface of the user terminal, from the authentication server, the unique identifier randomly selected by the authentication server; and
    retrieving the authentication challenge associated with the unique identifier from the memory.

12. A method according to claim 10, wherein the method comprises:
receiving the authentication challenge, via a network interface of the user terminal, from the authentication server, the authentication challenge randomly selected by the authentication server.

13. A method according to claim 12, wherein a notification message indicating that the identification document is authentic comprises said authentication challenge.

14. A method according to claim 1, wherein the authentication challenge requests the user to perform a static or dynamic physical gesture, or requests the user to read a portion of text.

15. A method according to claim 1, wherein the authentication challenge requests the user to read a portion of text.

16. A method according to claim 15, wherein the method further comprises:
receiving audio data using a microphone of the user terminal as a response to the authentication challenge; and
transmitting the audio data, via the network interface, over the network to the authentication server for authenticating the user with the third party.

17. A method according to claim 1, wherein the image data is received using a camera of the user terminal, and wherein the authentication challenge requests the user to capture one or more images of one or both of their eyes using the camera.

18. A method according to claim 1, wherein the image data is received using a finger print scanner of the user terminal, and wherein the authentication challenge requests the user to capture one or more images of a fingerprint of one or more of their fingers using the fingerprint scanner.

19. A method according to claim 1, wherein the method further comprises:
in response to transmitting the image data to the authentication server, receiving, via said network interface, a further notification message from the authentication server indicating whether the user has been successfully authenticated with the third party.

20. A method according to claim 19, wherein the further notification message indicates that the user has been successfully authenticated with the third party, the method further comprising enabling the user access to services provided by the third party.

21. A method according to claim 19, wherein the further notification message indicates that the user has not been successfully authenticated with the third party, the method further comprising:
outputting, via the at least one output device of the user terminal, a further authentication challenge to the user;
receiving image data as a response to the further authentication challenge; and
transmitting the image data, via the network interface, over the network to the authentication server for authenticating the user with the third party.

22. A method according to claim 1, wherein the user terminal is a mobile device.

23. A user terminal for providing secure authenticated registration between a user and a third party, wherein the user is associated with the user terminal, the user terminal comprising:
a network interface;
one or more processors configured to run an application associated with the third party, wherein the application is configured to:
read a chip to receive chip data stored on the chip;
transmit the chip data, via the network interface, over a network to an authentication server associated with said third party and in response receive, via said network interface, a notification message from the authentication server;
determine whether an identification document associated with the chip data is authentic based on the notification message from the authentication server, and in response to determining that the identification document is authentic, the application further configured to:
output, via at least one output device of the user terminal associated with the user, an authentication challenge to the user associated with the user terminal;
receive image data as a response to the authentication challenge; and
transmit the image data, via the network interface, over the network to the authentication server for authenticating the user with the third party.

24. A computer program product for providing secure authenticated registration between a user and a third party, the computer program product comprising code embodied on a non-transient computer-readable medium and configured so as when executed on a processor of a user terminal associated with the user to:
read a chip to receive chip data stored on the chip;
transmit the chip data, via a network interface of the user terminal, over a network to an authentication server associated with said third party and in response receive, via said network interface, a notification message from the authentication server;
determine whether an identification document associated with the chip data is authentic based on the notification message from the authentication server, and in response to determining that the identification document is authentic:
output, via at least one output device of the user terminal, an authentication challenge to the user associated with the user terminal;
receive image data as a response to the authentication challenge; and
transmit the image data, via the network interface, over the network to the authentication server for authenticating the user with the third party.

25. A method of using an authentication server to provide secure authenticated registration between a user and a third party associated with the authentication server, the method comprising:
receiving from a user terminal, chip data that has been obtained from a chip, wherein the user terminal is associated with the user;
determining authenticity of an identification document associated with the user by comparing the chip data to data pre-stored in a data store;
in response to determining that the identification document is authentic, transmitting a notification message to the user terminal associated with the user indicating that the identification document is authentic;
receiving image data as a response to an authentication challenge outputted to the user on the user terminal;
determining authenticity of the user associated with the user terminal based on the image data and the chip data; and
transmitting a further notification message to the user terminal indicating whether the user has been successfully authenticated with the third party.

26. An authentication server for providing secure authenticated registration between a user and a third party associated with the authentication server, the authentication server comprising a processor configured to:
- receive from a user terminal associated with the user, chip data that has been obtained from a chip;
- determine authenticity of an identification document associated with the user by comparing the chip data to data pre-stored in a data store;
- in response to determining that the identification document is authentic, transmit a notification message to the user terminal indicating that the identification document is authentic;
- receive image data as a response to an authentication challenge outputted to the user on the user terminal;
- determine authenticity of the user associated with the user terminal based on the image data and the chip data; and
- transmit a further notification message to the user terminal indicating whether the user has been successfully authenticated with the third party.

27. A computer program product for providing secure authenticated registration between a user and a third party, the computer program product comprising code embodied on a non-transient computer-readable medium and configured so as when executed on a processor of an authentication server associated with the third party to:
- receive from a user terminal associated with the user, chip data that has been obtained from a chip;
- determine authenticity of an identification document associated with the user by comparing the chip data to data pre-stored in a data store;
- in response to determining that the identification document is authentic, transmit a notification message to the user terminal indicating that the identification document is authentic;
- receive image data as a response to an authentication challenge outputted to the user on the user terminal;
- determine authenticity of the user associated with the user terminal based on the image data and the chip data; and
- transmit a further notification message to the user terminal indicating whether the user has been successfully authenticated with the third party.

* * * * *